(12) United States Patent
Etter

(10) Patent No.: US 9,314,128 B2
(45) Date of Patent: Apr. 19, 2016

(54) EXTRACTION SYSTEM FOR THE PRODUCTION OF A DRINK USING A CAPSULE

(75) Inventor: Stefan Etter, Kehrsatz (CH)

(73) Assignee: Nestec S.A., Vevey (CH)

( * ) Notice: Subject to any disclaimer, the term of this patent is extended or adjusted under 35 U.S.C. 154(b) by 259 days.

(21) Appl. No.: 13/639,976

(22) PCT Filed: Mar. 25, 2011

(86) PCT No.: PCT/EP2011/054656
§ 371 (c)(1),
(2), (4) Date: Oct. 8, 2012

(87) PCT Pub. No.: WO2011/124484
PCT Pub. Date: Oct. 13, 2011

(65) Prior Publication Data
US 2013/0174744 A1    Jul. 11, 2013

(30) Foreign Application Priority Data
Apr. 7, 2010  (EP) .................................. 10159189

(51) Int. Cl.
*A47J 31/06*  (2006.01)
*A47J 31/40*  (2006.01)
*A47J 31/36*  (2006.01)

(52) U.S. Cl.
CPC ............ *A47J 31/407* (2013.01); *A47J 31/3633* (2013.01); *A47J 31/3638* (2013.01)

(58) Field of Classification Search
CPC ..... A47J 31/407; A47J 31/18; A47J 31/4403; A47J 31/0636; A47J 31/20; A47J 31/02; A47J 31/0689; A47J 31/0642; A47J 31/44; A47J 31/40
USPC ................ 99/279, 284, 290, 302 P, 304–309, 99/316–323, 295; 426/77–83
See application file for complete search history.

(56) References Cited

U.S. PATENT DOCUMENTS 2,451,195 A * 10/1948 Brown ........................... 99/295
4,724,752 A *  2/1988 Aliesch et al. ............... 99/289 R
(Continued)

FOREIGN PATENT DOCUMENTS

EP        0512470       11/1992
EP        1654966        5/2006
(Continued)

OTHER PUBLICATIONS

Search Report of International Application PCT/EP2011/054656 mailed Aug. 4, 2011.

(Continued)

*Primary Examiner* — Eric Stapleton
(74) *Attorney, Agent, or Firm* — K&L Gates LLP

(57) ABSTRACT

System for preparing drinks from a capsule comprising: a capsule (1) including a body comprising an injection face and an extraction face with an opening and terminating in a collar (5) and a portion for delivery of the drink; the collar terminating in a free edge (8); a device for preparing drinks comprising: a first chamber portion (14) comprising a cavity of a shape suitable for substantially covering the body of the capsule and a clamping surface (23) which is engaged in compression against the collar, and a second chamber portion comprising an extraction plate, at least one of the two chamber portions being able to move relative to the other chamber portion from an open position in which the capsule is inserted to a closed position in which the capsule is enclosed between the two chamber portions, the first chamber portion (14) comprising means (32, 38) for hooking the capsule making it possible to keep the capsule in the said cavity of the said first portion during the transition from the closed position to the open position; the capsule comprising complementary means (8, 39) suitable for the takeover by these hooking means.

10 Claims, 9 Drawing Sheets

(56) References Cited

U.S. PATENT DOCUMENTS

| | | | |
|---|---|---|---|
| 5,197,374 A * | 3/1993 | Fond | 99/295 |
| 5,242,702 A * | 9/1993 | Fond | 426/433 |
| 5,388,502 A * | 2/1995 | Hufnagl | 99/295 |
| 5,398,595 A * | 3/1995 | Fond et al. | 99/295 |
| 5,398,596 A * | 3/1995 | Fond | 99/295 |
| 5,402,707 A * | 4/1995 | Fond et al. | 99/295 |
| 5,424,083 A * | 6/1995 | Lozito | 426/82 |
| 5,656,311 A * | 8/1997 | Fond | 426/84 |
| 5,897,899 A * | 4/1999 | Fond | 426/112 |
| 5,948,455 A * | 9/1999 | Schaeffer et al. | 426/77 |
| 6,026,732 A * | 2/2000 | Kollep et al. | 99/295 |
| 6,481,338 B1 * | 11/2002 | Wai | 99/302 R |
| 6,701,826 B2 * | 3/2004 | Wu | 99/305 |
| 6,990,891 B2 * | 1/2006 | Tebo, Jr. | 99/295 |
| 7,226,631 B2 * | 6/2007 | Thakur et al. | 426/477 |
| 7,444,927 B1 * | 11/2008 | Crosville et al. | 99/295 |
| 7,489,860 B2 * | 2/2009 | Startz | 392/478 |
| 7,640,844 B2 * | 1/2010 | Wu et al. | 99/299 |
| 7,654,321 B2 * | 2/2010 | Zazovsky et al. | 166/264 |
| 7,730,829 B2 * | 6/2010 | Hammad | 99/295 |
| 7,775,152 B2 * | 8/2010 | Kirschner et al. | 99/295 |
| 7,946,218 B2 * | 5/2011 | Weijers | 99/300 |
| 8,039,029 B2 * | 10/2011 | Ozanne | 426/77 |
| 8,202,560 B2 * | 6/2012 | Yoakim et al. | 426/431 |
| 8,304,006 B2 * | 11/2012 | Yoakim et al. | 426/431 |
| 2002/0148357 A1 * | 10/2002 | Lazaris et al. | 99/295 |
| 2004/0025701 A1 * | 2/2004 | Colston et al. | 99/279 |
| 2004/0250686 A1 * | 12/2004 | Hale | 99/295 |
| 2009/0308258 A1 * | 12/2009 | Boussemart et al. | 99/295 |
| 2010/0018401 A1 * | 1/2010 | Weinreich | 99/280 |

FOREIGN PATENT DOCUMENTS

| | | |
|---|---|---|
| EP | 1849715 | 10/2007 |
| EP | 1859712 | 11/2007 |
| EP | 1894854 | 3/2008 |
| EP | 2033551 | 3/2009 |
| EP | 2068684 | 2/2011 |
| EP | 2374383 A1 | 10/2011 |
| EP | 2374383 B1 | 11/2011 |
| FR | 2905844 | 3/2008 |
| WO | WO0235977 | 5/2002 |
| WO | WO2005004683 | 1/2005 |
| WO | WO2006045537 | 5/2006 |
| WO | 2008037642 | 4/2008 |
| WO | 2009115474 | 9/2009 |

OTHER PUBLICATIONS

Written Opinion of International Application PCT/EP2011/054656 mailed Aug. 4, 2011.

Japanese Office Action for Application No. P2013-503059, Dispatch No. 076953, dated Feb. 24, 2015, 4 pages.

* cited by examiner

EXTRACTION SYSTEM FOR THE PRODUCTION OF A DRINK USING A CAPSULE

The present invention relates to an extraction system for the production of a drink such as coffee comprising a capsule operating in an adapted device.

A system comprising a device using capsules is already known, for example, in application WO2005/004683. In this system, the capsule is designed to be inserted into a housing of the device between two chamber portions of the extraction module. The capsule is engaged in a guidance means, more particularly two guide rails receiving the collar of the capsule; which is positioned in an intermediate position in contact with retaining means, in particular, lugs housed in the rails. The capsule is then taken over by at least one of the chamber portions ("the injection cage") which moves linearly towards the other chamber portion ("the extraction plate") while forcing the capsule downwards; which causes the deformation of the collar and makes the capsule pass beneath the retaining means (lugs). The capsule is then positioned in the extraction position and enclosed by the two chamber portions.

In application WO2009/043630, the same principle is applied. However, the moveable chamber portion is associated with the guidance means; which causes the driving of the capsule towards the other chamber portion and its passing beneath the retaining means (lugs).

In the principle of these applications, when the device is reopened, at least one of the chamber portions retracts; the capsule then no longer being supported by the retaining means (lugs); this causes the capsule to fall simply by gravity and to be collected in a capsule tray.

A problem arises in that the extraction surface can stick against the extraction plate. This phenomenon occurs in particular when a capsule is forgotten in the device in the closed position for a prolonged period. This problem may have various origins, for example, the hardening of the liquid residue on the surface, the resoftening and the adhesion of the material of the surface of the capsule, the mechanical hooking of the surface onto the reliefs of the extraction plate, etc. When this problem occurs, the capsule is then no longer ejected naturally when the device is reopened (when one of the chamber portions retracts). It is then necessary to push the capsule manually or mechanically through the housing. The capsule may also be immobilized in the device and prevent or delay the use of the system with another capsule.

The object of the present invention is therefore to solve this problem by improving the systems of the prior art while providing a simple solution which makes the clearance of the capsule more reliable.

The present invention therefore relates to a system for preparing drinks from a capsule according to the claims of the present application.

In particular, the invention relates to a system for preparing drinks from a capsule containing a dose of ingredients comprising:

a capsule containing ingredients, the said capsule including a body in the form of a truncated cone comprising an injection face and an extraction face with an opening on the wider side and terminating in a collar, a portion for delivery of the drink closing at least partially the opening in the said body; the collar comprising a base portion connected to the body and terminating in a free edge, forming preferably a bulge; the collar of the capsule being furnished with a sealing means fitted to or forming an integral part of the collar and optionally extending partially over the side of the body, the sealing means preferably being in relief or forming an increase in thickness relative to the rest of the collar and, a device for preparing drinks comprising:
a frame,
a guidance means for allowing the capsule to be inserted into the device, in particular by guidance of its collar,
a first chamber portion comprising a cavity of a shape suitable for substantially covering the body of the capsule, liquid injection means and a clamping surface which interacts in engagement with the sealing means of the collar,
a second chamber portion comprising an extraction plate, preferably furnished with orifices for the clearance of the drink passing through the delivery portion on the side of the extraction face,
at least one of the two chamber portions being able to move relative to the other chamber portion from an open position in which the capsule is inserted to a closed position in which the capsule is enclosed between the two chamber portions.

One enhancement according to the invention consists in that the first chamber portion comprises means for hooking the capsule making it possible to keep the capsule in the said cavity of the said first portion during the transition from the closed position to the open position; the capsule comprising complementary means suitable for the takeover by these hooking means.

Thus, the risk that the capsule is accidentally retained against the extraction plate is eliminated since the capsule is kept in the first chamber portion by hooking means. When the device is reopened, the capsule is then sure of being kept in place in the chamber portion at least sufficiently for the capsule to be separated from the extraction plate.

According to a general feature of the invention, the device also comprises means for releasing the capsule which act on the capsule and/or the hooking means in order to release the capsule from the first chamber portion; so that the capsule can then fall by simple gravity. Preferably, the releasing means act on the collar of the capsule in order to serve it as an abutment during the relative movement between the chamber portions when the device opens thus causing the capsule to be pushed out of the cavity of the first chamber portion.

The capsule is adapted to the device and notably to the hooking means. For this, the capsule comprises a free edge which preferably comprises a bulge portion, forming at least one portion of the said complementary means, which is arranged so as to be able to be clipped into hooking means. In this case, the hooking means are preferably formed by at least one hook. This hook is preferably situated on the outer edge of the first chamber portion. It may protrude from the clamping edge of the said first portion so as to take over the collar of the capsule, preferably the said bulging portion; which is designed so as to protrude radially relative to the clamping edge.

Preferably, the bulge on the free edge of the collar forms a substantially toroidal edge with a diameter designed to be ratcheted into at least two hooks. The hooks are preferably situated in an angularly distant manner on either side of the outer edge of the first chamber portion. An angular offset of at least two hooks makes it possible to ensure the takeover of the collar of the capsule in a more reliable manner. Preferably, the hooking means comprise at least two diametrically opposed hooks or else three hooks distributed over the periphery of the outer edge of the chamber portion. Each hook is elastically deformable so as to open under the effect of the pressure of the capsule, for example, its collar on contact with it, and to reclose once the capsule has been put in place in the cavity of the chamber portion. In particular, the hook comprises a base portion that can flex outwards when the bulge of the collar passes.

The capsule is designed to be held by the hooking means, notably the said hooks. For this, the collar has a diameter that is substantially equal to the internal diameter of the housing of the said hook but slightly greater than the maximum diameter of the ramp portion of the hook. For this, the collar has a maximum diameter (D) of approximately 37 mm and a maximum thickness (w) of approximately 0.5 to 2 mm.

According to one feature of the invention, other hooking means are provided in order to enhance the taking over of the capsule. For this, the hooking means comprise at least one protruding ridge portion extending from the inner surface of the cavity to the inside of the latter in order to delimit a restricted opening section of cavity. The capsule comprises a frustoconical wall portion on the side of the body, forming the other portion of the said complementary means, in order to deform without breaking on contact with the said protruding ridge portion. The frustoconical wall portion of the capsule preferably forms a portion with a section slightly larger than the restricted opening section of the cavity by the said at least one ridge portion so as to be able to deform without breaking when the capsule is placed in the said cavity. The wall portion of the capsule is preferably deformed when it is inserted without breaking by at least two ridge portions that are angularly distant from one another and extend from the inner surface of the cavity or else a continuous ridge portion extending over the whole periphery of the cavity.

The frustoconical wall portion of the body of the capsule is preferably made of deformable material such as aluminium, plastic or a starch-based material. Preferably, the whole body is formed of the same material. However, a reinforcement or a more flexible portion may be provided in this portion and/or a change of material in order to promote the deformation of the said portion without breaking.

In general, the frustoconical wall portion of the capsule preferably has a thickness of between 0.1 and 1 mm, preferably 0.2 and 0.7 mm.

Outside the ridge portions, the cavity of the chamber portion is of substantially frustoconical shape preferably complementing the shape of the capsule but substantially wider. More particularly, the body of the capsule is dimensioned so as to release an interstice between its surface and the clamping portion of the said first portion on the said bearing portion of the collar. The clamping portion also comprises slots extending radially and/or towards the inside of the cavity. The sealing means is also designed to deform and fill by compression, on a peripheral line at least, the said slots in order to provide a seal between the capsule and the said first portion during the closure of the said first and second portions around the capsule and/or when the sealing means comes into contact with the injected liquid.

The sealing means may, for example, be formed by a ring in relief fixed to or forming an integral part of the bearing portion of the body of the capsule. It may be made of a material such as silicone, rubber, plastic, cellulose, modified starch or any combination of these materials.

According to another aspect of the invention, provision is also made to orient the extraction plate in the position so as to reduce the risk of blockage as described in the jointly pending application EP10290148.5. For this, the extraction plate comprises a surface furnished with a series of several rows of elements in relief delimiting several rows of channels; and means for positioning the said plate in the said frame or a portion of the latter; the said positioning means being configured with respect to means for indexing the said plate, so as to orient the said plate so that the said channels are inclined relative to a horizontal plane at an angle of more than 15 degrees, preferably in the vicinity of 45 (+/−10) degrees.

The invention will also be understood with reference to the drawings which are appended.

Figure 1:
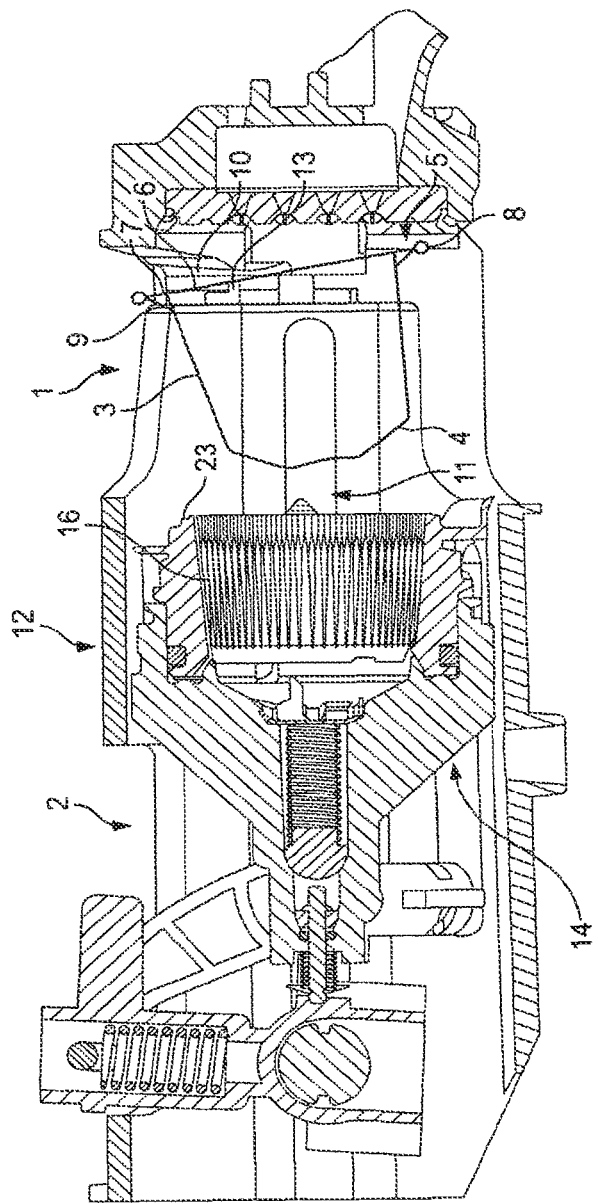
FIG. 1 represents a schematic longitudinal section of the system when the capsule (shown transparently) is in the intermediate retention position after it has been inserted into the device.

As illustrated in FIG. 1, the system according to the invention comprises a capsule 1 operating in a device for preparing a drink 2 (shown partially).

The capsule comprises a body 3 in the form of a truncated cone. The body is furnished, on a first side, with an injection face 4, usually closed and able to be perforated or already furnished with perforations allowing water to pass through the capsule. The body of the capsule is terminated, on a second side, by a collar 5 which extends radially beyond the body and over the whole circumference of its widest base. On this side of the extraction face, the body comprises an opening closed at least partly by a delivery portion or wall 6. The collar comprises a base portion 7 and a free edge 8, preferably in the form of a bulge. The collar comprises a sealing means 9 which is fitted to or incorporated into the base portion of the collar. The sealing means may be a compressible material. It may also soften in contact with the fluid applied under pressure during extraction. These compression and softening aspects may be combined to achieve a sealed engagement.

The capsule contains ingredients allowing the preparation of a drink. In particular, the ingredients may be ground coffee, instant coffee, tea, cocoa, powdered milk and any possible combination of these ingredients.

It should be noted that the capsule is of a dimension and of a shape suitable for the device so as to form a complementary system that is easy and efficient in use.

For its part, the device for preparing drinks comprises a guidance means in the form of two guide rails 10 placed on either side of the capsule at a distance allowing the guidance of the collar 5 of the capsule (note that only one rail 10 can be shown in the section of FIG. 1). This guidance means thus allows the capsule to be inserted into a housing 11 of the frame 12 of the device. The capsule is therefore kept in an intermediate position as shown in FIG. 1 by retention means 13, more particularly lugs, placed in the rails at a height such that the capsule remains placed above the longitudinal axis of extraction as will be explained below.

The device comprises, between the housing 11, a first chamber portion 14 and a second chamber portion 15 which can be moved relative to one another in order to close against the capsule. It should be noted that only one chamber portion can be moveable and the other chamber portion is fixed or else both portions can be moveable. In the embodiment shown, the first chamber portion 14 is moveable while the second chamber portion 15 is fixed but this arrangement could be inverted as described in application WO 2009/043630.

In the example illustrated, the first chamber portion 14 comprises a cavity 16 of a shape that substantially complements the shape of the body of the capsule. This cavity is therefore also substantially frustoconical and is flared towards its opening so as to be able to take over the capsule when the device closes. The chamber portion 14 comprises means 17 for injecting liquid (pressurized hot water) comprising, for example, a liquid inlet 18, means 19 for perforating the injection face of the capsule 19, for example blades, and a non-return valve 20. The chamber portion may be formed of several chamber portions, as shown here, of a base portion 21 which is extended by a piston portion 22. Thus, the piston portion is pushed back during the closure against the collar of the capsule by the hydraulic force of the liquid which acts on the piston portion in the direction of axial closure as is described in patent application EP2068684. The chamber portion 14, more precisely, its piston portion 22 comprises a front clamping surface 23 which is designed to be pressed against the sealing means 9 of the capsule in order to ensure a sealed or virtually sealed engagement with the pressurized liquid. During the clamping or pressure, the sealing means is sufficiently compressed to compensate for the irregularities of the clamping surface 23. As is described in application EP2068684, the clamping surface 23 of the first chamber portion preferably comprises grooves extending at least radially on either side of the front clamping surface.

It should be noted that the device also comprises an actuation mechanism 24 for closing the chamber portions, in particular shown here for closing the first portion. Any mechanism can be envisaged, such as for example a knuckle-joint mechanism that can be actuated by a lever (not shown) or else a cam or a screw mechanism.

In a general manner, the second chamber portion 15 comprises an extraction plate 25 furnished with orifices 26 for carrying away the drink. In addition, the plate may comprise elements in relief 27 for allowing the delivery portion (for example, an aluminium or plastic membrane) to open under the effect of the internal pressure generated in the capsule. This principle is described in patent EP0512470B1. The extraction plate 25 may be housed in a housing of a front portion 28 of the frame. The front portion may also comprise a collection chamber 29 terminating in a duct or a funnel 30 for delivery of the drink. It should also be noted that, in one possible situation, the extraction wall is mounted in a moveable portion of the second chamber portion.

Figure 2:
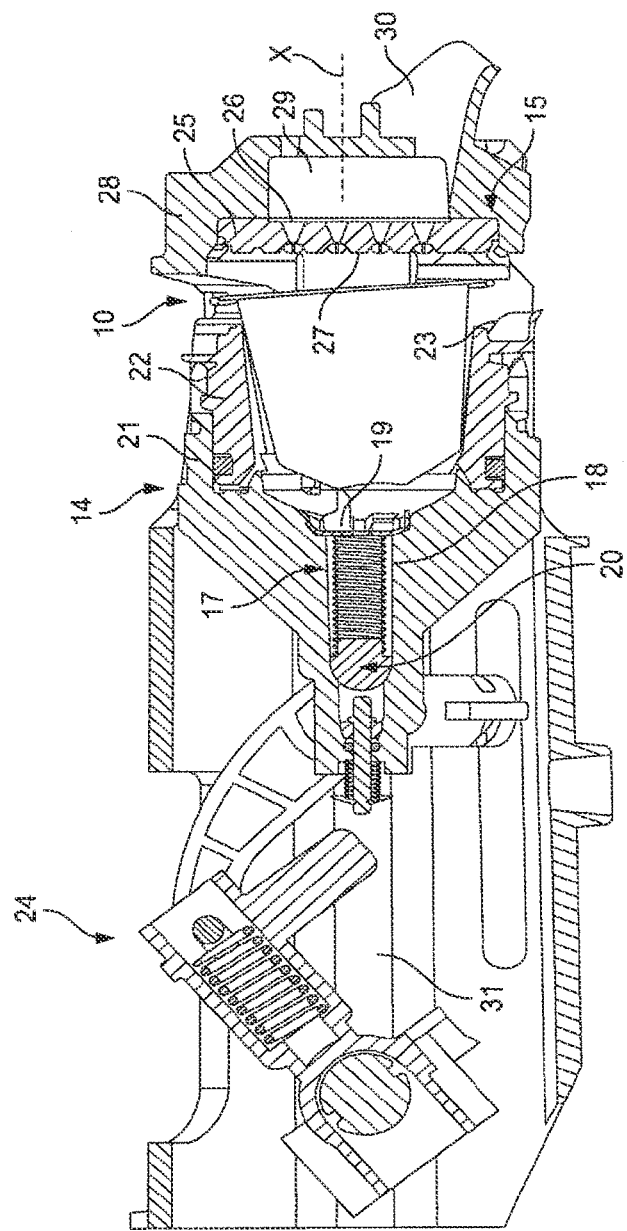
FIG. 2 represents a longitudinal section of the system when the device is reclosed onto the capsule but before complete mechanical closure.

FIG. 2 shows the device being closed against the capsule. For this, the first chamber portion is moved by means of the actuation mechanism 24 and is moved substantially linearly in the direction of the second chamber portion 15. The first chamber portion 14 is thus guided in translation through translational guidance means comprising, amongst other things, two grooves 31 present in the frame, in which grooves two lateral guide ribs or fingers 50, 51 (shown in FIG. 4) of the portion 14 are arranged. It should be noted that the movement of the chamber portion in the frame is not necessarily purely linear but may also combine horizontal and inclined movements (via a portion of ramp for example) depending on the particular shape given to the guide grooves 31.

Figure 3:
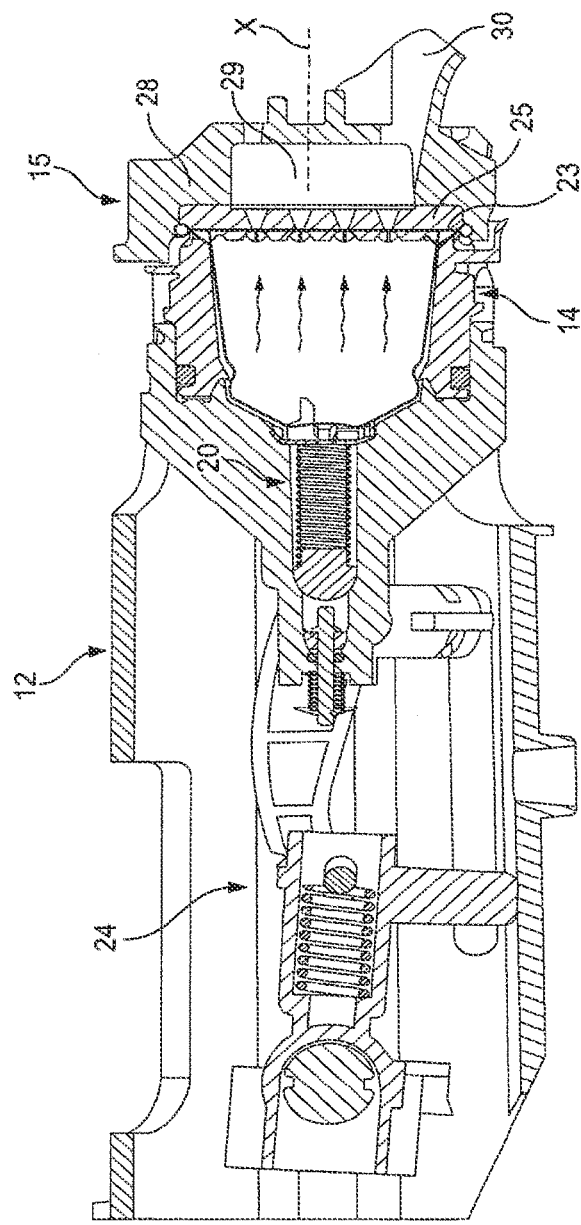
FIG. 3 shows a longitudinal section of the system when the device is closed and the capsule is in the extraction position.

As described in application WO2005/004683, the principle is essentially that the first chamber portion 14 takes over the capsule 1 during its movement relative to the second chamber portion 15 and forces it to descend from its intermediate position (FIG. 1) to an extraction position (FIG. 3). For this, the capsule is kept in the intermediate position (FIG. 1) (in an inclined position because of its asymmetric shape and because of its centre of gravity relative to its collar) above the axis "X" representing the extraction axis when the capsule is enclosed (FIG. 3). The extraction axis is the mid-line of the capsule or else of the cavity 16 passing through the centre of the extraction wall during closure of the device. The takeover of the capsule takes place by the cavity 16 of the first portion being engaged around the body 3 of the capsule and forcing it to descend and to re-establish itself in the extraction axis "X". When the capsule descends, the collar of the capsule deforms in order to pass beneath the retaining means (lugs). It is also necessary to note that the movement is relative and that it could be the second portion that is moveable driving the capsule towards a first fixed portion. It should also be noted that the retaining means could be elastically deformable.

During the closing movement (FIG. 2 then FIG. 3), the chamber portion 14 is engaged by clamping against the collar of the capsule while squeezing the latter against a peripheral surface of the extraction plate 25. An interstice is created between the cavity 16 and the surface of the body of the capsule. However, during the extraction, the liquid is prevented from escaping through the clamping edge 23 by virtue of the presence of the sealing means of the capsule: which at least partly fills the irregularities (grooves) of the said surface. Thus the liquid can pass through the capsule (and the bed of ingredients) from the injection means 20 to the orifices located in the extraction plate 25.

Figure 4:
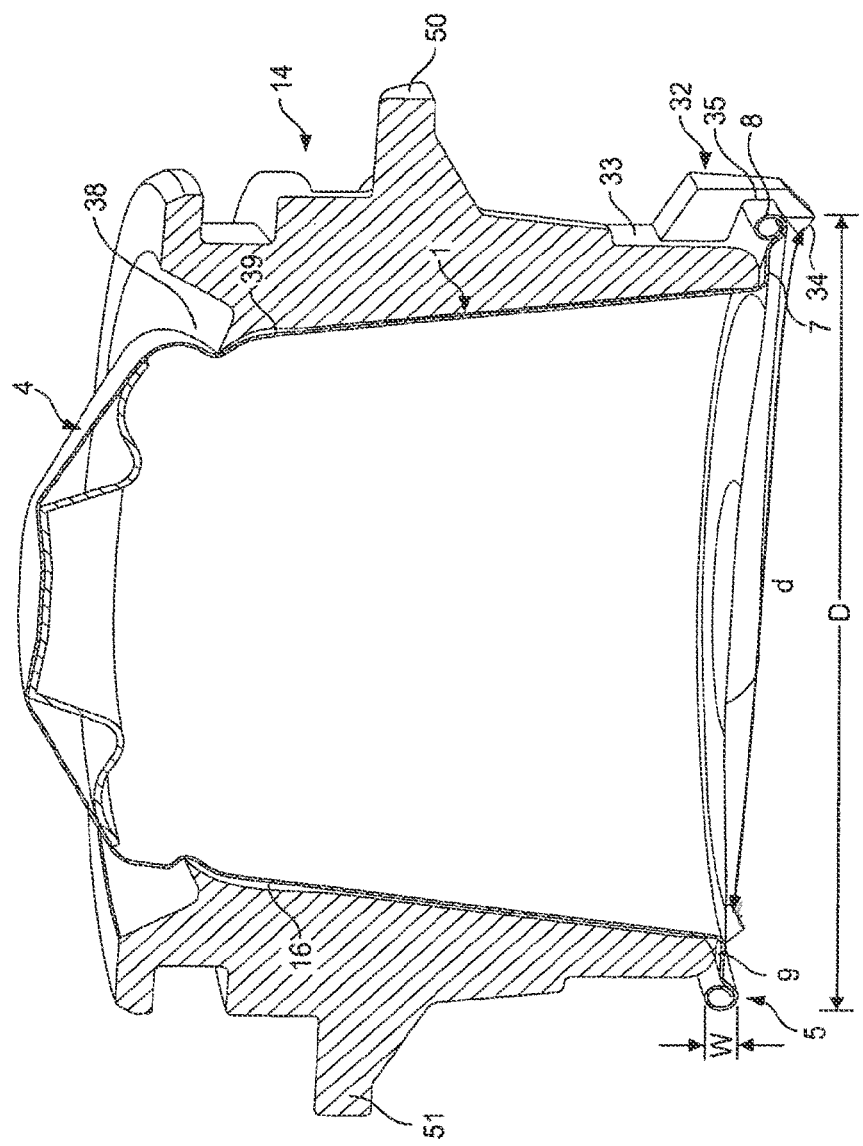
FIG. 4 shows an enlarged view in section of a capsule taken over by the hooking means of the device.

According to one aspect of the present invention illustrated in FIG. 4, during the closure of the device, the capsule 1 interacts with the device 2 so as to be engaged in the cavity 16 of the first chamber portion 14 and to be held there by hooking means during the closure in the configuration illustrated in FIG. 3. The hooking means comprise at least one hook 32 which extends beyond the clamping edge 23 and towards the outside of the latter. The hook extends beyond the cavity from the outer edge 33 of the first chamber portion (piston portion 22). The collar of the capsule comprises a free edge 8 in the form of a bulge which is engaged inside the hook 32. The free edge 8 is engaged by clipping into the hook 32 during the closure of the device, that is to say by the clamping forces exerted by the clamping edge 23 against the collar 5. Preferably, several hooks are provided spaced circumferentially over the periphery of the cavity. Preferably, at least two hooks are provided so as to hold the collar correctly and prevent a partial disengagement of the capsule from the cavity.

The collar 5 is of a dimension to be able to be inserted perfectly into the hooks. For this, the collar has a maximum diameter "D" substantially greater than the maximum diameter "d" of the ramp portion 34 of the hook allowing it to be engaged in the housing 35 of the hook. The thickness of the collar is also designed to be inserted into the housing 35. An optimal diameter of the collar is approximately 37 mm and an optimal thickness (w) is approximately 0.5 to 2 mm. The thickness "w" is in this instance measured axially, that is to say perpendicularly to the diametral axis. The inside of the housing of the hook is also furnished with a ramp surface allowing the collar to be disengaged by forcing the base portion of the hook to flex outwards during the engagement of the collar by abutment means as will be explained below.

In the position of engagement of the capsule in the hooking means or hooks 32 (FIG. 4), the sealing means or seal 9 is not sufficiently compressed by the surface 23 to form a seal (that is to say a compensation by the material of the seal for the surface irregularities such as radial grooves) so that it does not exert suction forces or other phenomena that can make disengagement of the capsule difficult.

Other hooking means may be provided such as protruding ridge portions 38 extending from the inner surface of the cavity to the inside of the latter. These ridge portions thus delimit a restricted or narrowed section of the cavity 16 forcing the body of the capsule to deform inwards as illustrated in FIG. 4. For this, the capsule comprises a frustoconical wall 39 of larger section at rest and which is deformed without breaking under the effect of the pressure exerted by the ridge portions 38. When the capsule is placed in the cavity of the first chamber portion 14, the sides 39 of the capsule are deformed by the ridges which are oriented slightly towards the injection face 4, so as to keep the capsule gripped in the cavity.

In one possible embodiment, it would be possible to provide a single hooking means, that is to say either the hooks 32 or the ridge portions 38.

Figure 5:
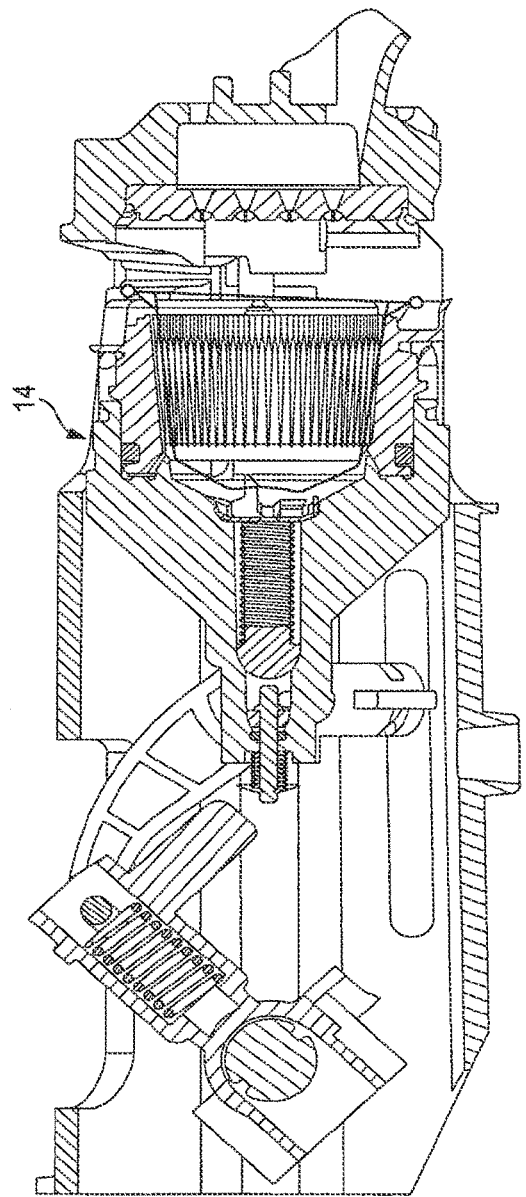
FIG. 5 represents a schematic view in longitudinal section of the system when the device is reopened.

When the device is opened after the end of the extraction as shown in FIG. 5, the chamber portions are parted relative to one another. Means for releasing the capsule are provided in order to disengage the capsule from the cavity under the effect of the relative movement of the said portions. More precisely, when the first chamber portion 14 is retracted, it forces the collar of the capsule (which protrudes radially beyond the chamber portion) to press against an abutment surface 40 that is present in the frame. The abutment surface 40 may comprise several surface portions which are dimensioned and located in order to come into contact with the free portion or bulge 8 of the collar. A lateral recess 44 is also provided in the frame in order to allow the hooks to pass while stopping the collar of the capsule.

Figure 6:
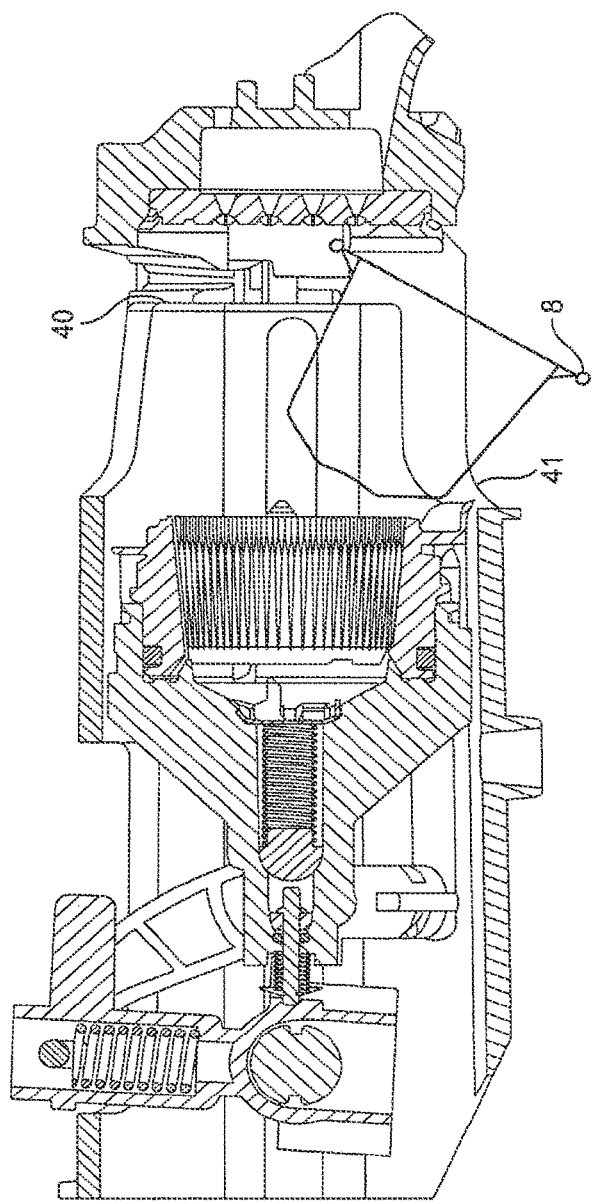
FIG. 6 represents a view in longitudinal section of the system on reopening of the device causing the capsule to be ejected.
Figure 7:
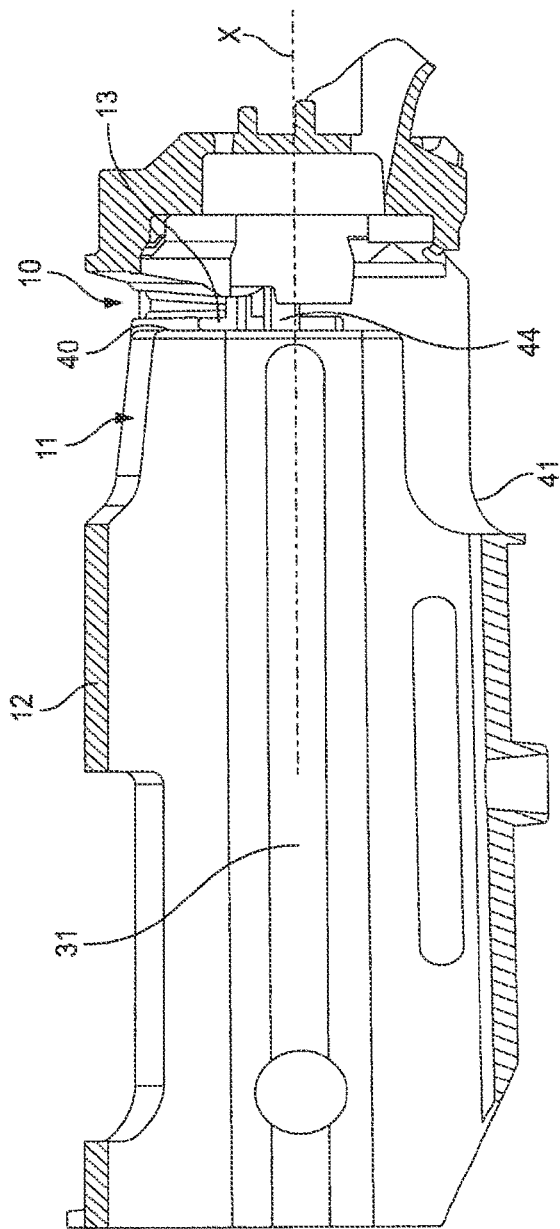
FIG. 7 represents a view in longitudinal section of the frame of the device.

As shown in FIGS. 5 and 6, the capsule is then disengaged from the hooking means and can fall by gravity through an orifice 41 made in the frame.

Figure 8:
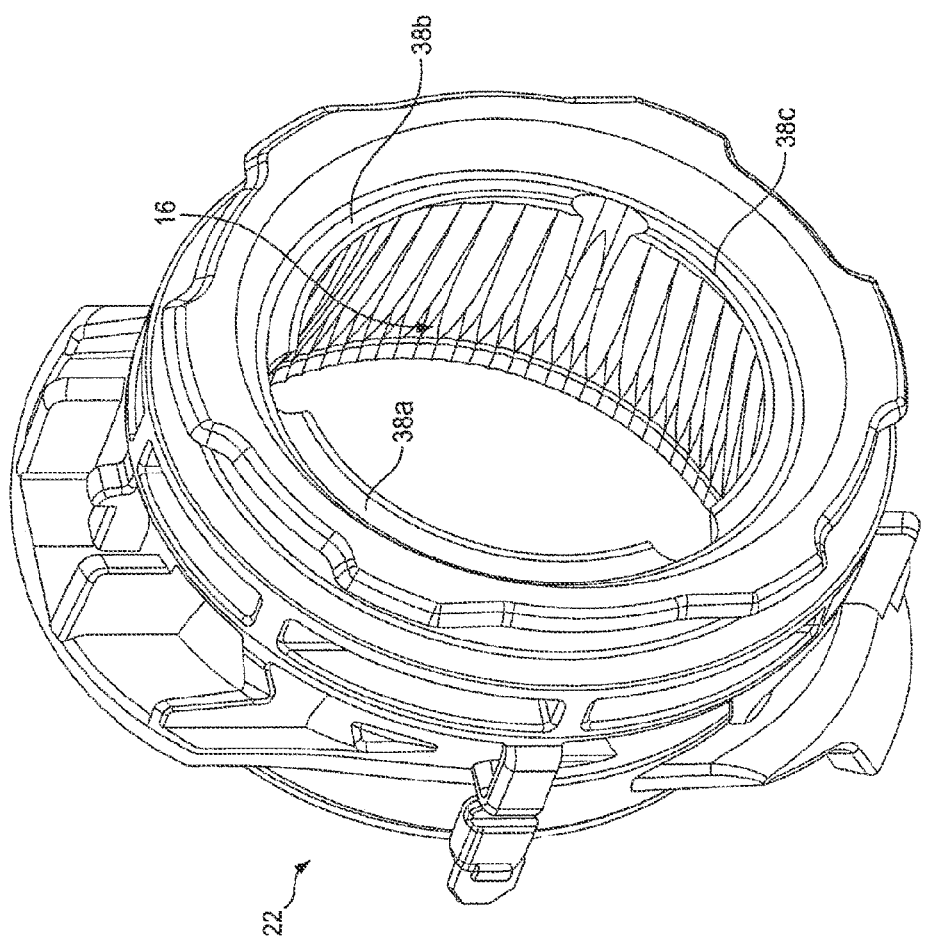
FIG. 8 shows a rear view in perspective of the piston of the chamber portion.
Figure 9:
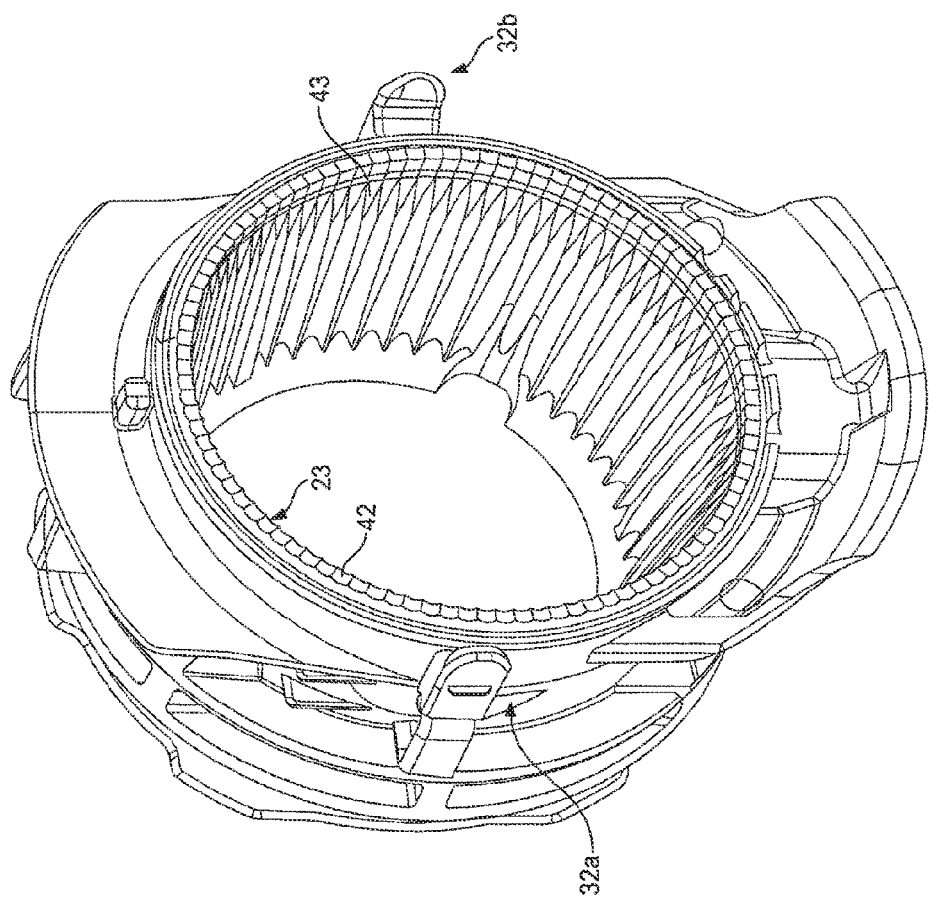
FIG. 9 shows a front view in perspective of the piston of the chamber portion.

FIGS. 8 and 9 show details of the piston portion 22 of the first chamber portion. Notably, the inner face of the portion 22 (FIG. 8) comprises several ridge portions 38a, 38b, 38c distributed over the periphery of the cavity and forming a restricted opening section for the capsule. Two hooks 32a, 32b are also illustrated which are made of one material and in one piece in the piston portion. The hooks are elastically deformable because of the material forming them such as plastic and/or metal. Note also that the clamping surface 23 has a plurality of radial grooves 42 which are designed to interact in engagement with the sealing means of the capsule. The grooves may extend towards the inside of the cavity forming grooves 43 of greater depth.

Naturally the invention may comprise many variants.

The invention claimed is:

1. A system for preparing drinks, the system comprising:
   a capsule containing a dose of ingredients, the capsule including a body in the form of a truncated cone comprising an injection face and an extraction face with an opening on the wider side and terminating in a collar, a portion for delivery of the drink closing at least partially the opening in the body; the collar comprising a base portion connected to the body and terminating in a free edge; the collar of the capsule comprising a seal fitted to or forming an integral part of the collar; and
   a device for preparing drinks, the device comprising:
      a frame,
      a guide for allowing the capsule to be inserted into the device,
      a first chamber portion comprising a cavity of a shape suitable for covering the body of the capsule, a liquid injector and a clamping edge which interacts in engagement with the seal of the collar,
      a second chamber portion comprising an extraction plate,
      at least one of the two chamber portions being able to move relative to the other chamber portion from an open position in which the capsule is inserted to a closed position in which the capsule is enclosed between the two chamber portions,
      the first chamber portion comprising a hook member for hooking the capsule making it possible to keep the capsule in the cavity of the first chamber portion during the transition from the closed position to the open position, the capsule comprising a complementary member suitable for attaching to the hook member, and
      a release mechanism configured to release the capsule by acting on at least one of the capsule and the hook member in order to release the capsule from the first chamber portion, the capsule then being able to fall by its own weight, the release mechanism comprising an abutment surface in the frame configured to contact the free edge of the collar and further comprising a lateral recess in the frame positioned to allow the hook member to pass while the collar of the capsule is stopped by the abutment surface.

2. The system according to claim 1, wherein the free edge of the collar comprises a bulge portion, forming at least one portion of the complementary member, which is arranged so as to be able to be clipped into hook member formed by at least one hook situated on the outer edge of the first chamber portion and protruding from the clamping edge of the first chamber portion.

3. The system according to claim 2, wherein the bulge portion of the free edge of the collar forms a toroidal edge with a diameter designed to be ratcheted into at least two hooks situated in an angularly distant manner on the outer edge of the first chamber portion.

4. The system according to claim 3, wherein the collar has a maximum diameter of approximately 37 mm and a maximum thickness of 0.5 to 2 mm.

5. The system according to claim 3, wherein the hook member comprises at least two diametrically opposed hooks on the periphery of the outer edge of the chamber portion.

6. The system according to claim 1, wherein the hook member comprises at least one protruding ridge portion extending from the inner surface of the cavity to the inside of the cavity in order to delimit a restricted opening section of cavity, the capsule comprising a frustoconical wall portion on the side of the body, forming the other portion of the complementary member, in order to deform without breaking on contact with the protruding ridge portion, and the frustoconical wall portion forming a portion with a section larger than the section of the cavity restricted by the at least one ridge so as to deform when the capsule is placed in the cavity.

7. The system according to claim 6, wherein the capsule portion has a thickness of between 0.2 and 1 mm.

8. The system according to claim 1, wherein the cavity has a frustoconical shape and is wider than the capsule, the body of the capsule being dimensioned so as to release an interstice of 2 to 10 mm at a maximum between its surface and the surface of the cavity.

9. The system according to claim 1, wherein the clamping edge of the first chamber portion comprises slots extending radially and/or towards the inside of the cavity, and partly covers at least the seal, which is designed to deform and fill by compression, on a peripheral line at least, the slots in order to provide a seal between the capsule and the first chamber portion during the closure of the first and second chamber portions around the capsule and/or when the seal comes into contact with the injected liquid.

10. The system according to claim 9, wherein the seal is formed by a ring in relief fixed to or forming an integral part of a bearing portion of the body of the capsule.

* * * * *